US009892858B2

(12) United States Patent
Aoyama et al.

(10) Patent No.: US 9,892,858 B2
(45) Date of Patent: Feb. 13, 2018

(54) METHOD FOR MANUFACTURING ELECTROLYTIC CAPACITOR

(71) Applicant: PANASONIC INTELLECTUAL PROPERTY MANAGEMENT CO., LTD., Osaka (JP)

(72) Inventors: Tatsuji Aoyama, Osaka (JP); Yukiya Shimoyama, Osaka (JP); Junya Kushizaki, Osaka (JP); Takuya Maruta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/323,386

(22) PCT Filed: Jun. 26, 2015

(86) PCT No.: PCT/JP2015/003213
§ 371 (c)(1),
(2) Date: Dec. 30, 2016

(87) PCT Pub. No.: WO2016/002176
PCT Pub. Date: Jan. 7, 2016

(65) Prior Publication Data
US 2017/0133159 A1    May 11, 2017

(30) Foreign Application Priority Data
Jul. 3, 2014  (JP) .................................. 2014-137557

(51) Int. Cl.
*H01G 9/00*  (2006.01)

(52) U.S. Cl.
CPC ................................ *H01G 9/0032* (2013.01)

(58) Field of Classification Search
None
See application file for complete search history.

(56) References Cited

U.S. PATENT DOCUMENTS

| 7,497,879 B2 | 3/2009 | Kakuma et al. |
| 2011/0119879 A1 | 5/2011 | Ishimaru |

(Continued)

FOREIGN PATENT DOCUMENTS

| JP | 2008-010657 A | 1/2008 |
| JP | 2011-109024 A | 6/2011 |

(Continued)

OTHER PUBLICATIONS

International Search Report and Written Opinion issued in International Patent Application No. PCT/JP2015/003213, dated Sep. 1, 2015; with partial English translation.

*Primary Examiner* — Angel Roman
(74) *Attorney, Agent, or Firm* — McDermott Will & Emery LLP

(57) ABSTRACT

A method for manufacturing an electrolytic capacitor includes: a first step of preparing a capacitor element including an anode having a dielectric layer; a second step of impregnating the capacitor element with a first processing solution including at least a conductive polymer and a first solvent; and a third step of swelling the conductive polymer after the second step, by impregnating the capacitor element with a second processing solution including a swelling agent while at least part of the first solvent remains in the capacitor element.

20 Claims, 1 Drawing Sheet

(56) References Cited

U.S. PATENT DOCUMENTS

| | | | |
|---|---|---|---|
| 2012/0300368 A1 | 11/2012 | Matsuura et al. | |
| 2013/0279079 A1 | 10/2013 | Merker et al. | |
| 2015/0029642 A1* | 1/2015 | Shi | H01B 1/127 361/532 |
| 2016/0211082 A1* | 7/2016 | Shi | H01G 9/15 |
| 2017/0098510 A1* | 4/2017 | Uka | H01G 9/028 |

FOREIGN PATENT DOCUMENTS

| | | |
|---|---|---|
| JP | 2013-214674 A | 10/2013 |
| JP | 2013-539227 A | 10/2013 |
| WO | 2011-099261 A1 | 8/2011 |

\* cited by examiner

METHOD FOR MANUFACTURING ELECTROLYTIC CAPACITOR

RELATED APPLICATIONS

This application is the U.S. National Phase under 35 U.S.C. § 371 of International Patent Application No. PCT/JP2015/003213, filed on Jun. 26, 2015, which in turn claims the benefit of Japanese Application No. 2014-137557, filed on Jul. 3, 2014, the disclosures of which Applications are incorporated by reference herein.

TECHNICAL FIELD

The present invention relates to a method for manufacturing an electrolytic capacitor, more specifically to a method for manufacturing an electrolytic capacitor excellent in film recoverability of dielectric layer.

BACKGROUND ART

As the trend toward digitization of electronic equipment continues, the capacitors incorporated therein have been demanded to be small in size and high in capacitance and have a low equivalent series resistance (ESR) in a high frequency range.

As promising capacitors being small in size and high in capacitance and having a low ESR, electrolytic capacitors including an electrically conductive polymer such as polypyrrole, polythiophene, polyflan and polyaniline, as a cathode material, are expected. For example, one proposal suggests an electrolytic capacitor in which a conductive polymer layer is provided as a cathode material on an anode foil (anode) with a dielectric layer formed thereon.

Patent Literature 1 discloses a method for manufacturing an electrolytic capacitor including a conductive solid layer and electrolyte, by impregnating an element including a separator, with a dispersion of conductive polymer, thereby to form a conductive solid layer, and then impregnating the element with electrolyte.

CITATION LIST

Patent Literature

[PTL 1] Japanese Laid-Open Patent Publication No. 2008-010657

SUMMARY OF INVENTION

Technical Problem

The dielectric layer is formed by surface treatment on an anode foil, and therefore, it essentially has many defects. Such defects tend to cause leakage current. According to the method of Patent Literature 1, the film recoverability, that is the ability of recovering the defects of the dielectric layer, may become insufficient depending on the conditions for forming the conductive solid layer containing a conductive polymer.

Solution to Problem

One aspect of the present invention relates to a method for manufacturing an electrolytic capacitor. The method includes:

a first step of preparing a capacitor element including an anode having a dielectric layer;

a second step of impregnating the capacitor element with a first processing solution including at least a conductive polymer and a first solvent; and a third step of swelling the conductive polymer after the second step, by impregnating the capacitor element with a second processing solution including a swelling agent while at least part of the first solvent remains in the capacitor element.

Advantageous Effects of Invention

According to the present invention, an electrolytic capacitor exhibiting excellent film recoverability and suppressed leakage current can be obtained.

DESCRIPTION OF EMBODIMENTS

Embodiments of the method for manufacturing an electrolytic capacitor according to the present invention will be described below with reference to drawings as appropriate. The following embodiments, however, should not be construed as limiting the present invention.

<<Electrolytic Capacitor>>

Figure 1:
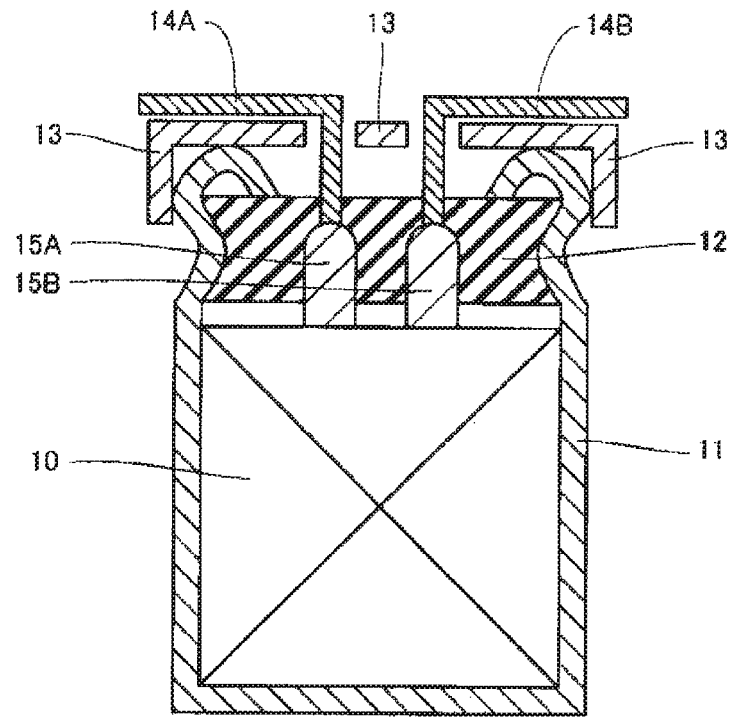
FIG. 1 A schematic cross-sectional view of an electrolytic capacitor obtained by a manufacturing method according one embodiment of the present invention.
Figure 2:
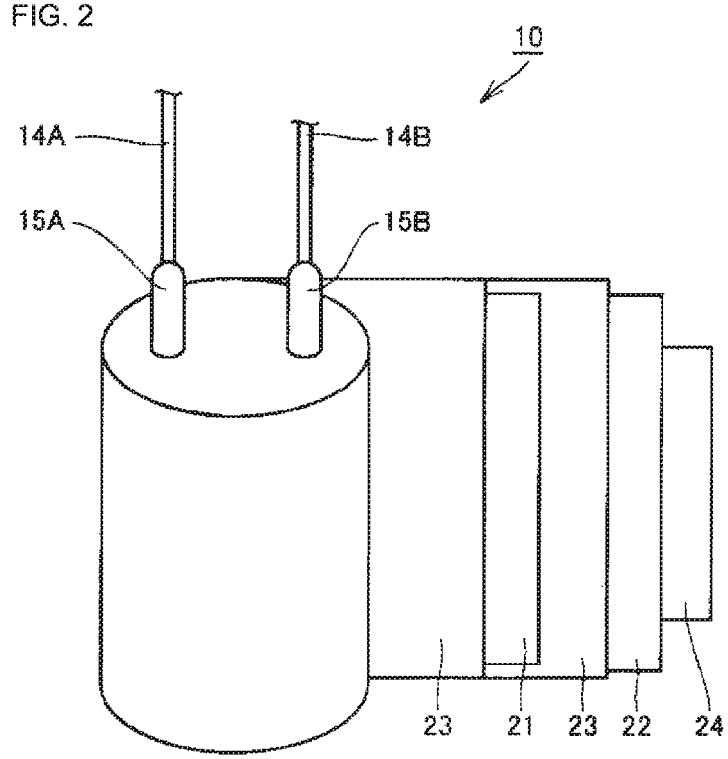
FIG. 2 A schematic drawing for explaining the configuration of a capacitor element in the electrolytic capacitor of FIG. 1.

FIG. 1 is a schematic cross-sectional view of an electrolytic capacitor obtained by a manufacturing method according to one embodiment of the present invention. FIG. 2 is a schematic partially exploded view of a capacitor element according to the electrolytic capacitor of FIG. 1.

In FIG. 1, the electrolytic capacitor includes a capacitor element 10 including an anode 21 with a dielectric layer formed thereon, and a conductive polymer (not shown) coating at least part of the surface (or adhering to at least part of the surface) of the dielectric layer. The capacitor element 10, with at least part of the surface of the dielectric layer coated with the conductive polymer, is placed in a packaging case. The packaging case includes a bottom-closed case 11 accommodating the capacitor element 10 therein, an electrically insulative sealing member 12 closing the opening of the bottom-closed case 11, and a seat plate 13 covering the sealing member 12. The bottom-closed case 11 is constricted inwardly near the opening end, and the opening end is curled and crimped onto the sealing member 12.

For example, the capacitor element 10 as illustrated in FIG. 2 is called a wound body. The capacitor element 10 includes an anode 21 connected to a lead tab 15A, and a cathode 22 connected to a lead tab 15B, and a separator 23. The anode 21 and the cathode 22 are wound with the separator 23 therebetween. The outermost layer of the capacitor element 10 is fixed with an unwinding prevention tape 24. FIG. 2 illustrates a partially exploded view of the capacitor element 10 before the outermost layer is fixed.

The anode 21 includes a metal foil having a surface roughened so as to have projections and depressions, and a dielectric layer formed on the metal foil having projections and depressions.

In the electrolytic capacitor, the conductive polymer adheres so as to coat at least part of the surface of the dielectric layer formed on the anode 21, but not limited thereto, and may adhere anywhere between the anode 21 and the cathode 22. For example, the conductive polymer may coat at least part of the surface of the dielectric layer formed on the anode 21, and further coat at least part of the surface of the cathode 22 and/or at least part of the surface of the separator 23. It is to be noted that in electrolytic capacitors, the conductive polymer (specifically, a film containing the conductive polymer) coating at least part of the surfaces of the anode, cathode and separator is sometimes commonly called a conductive polymer layer.

The electrolytic capacitor may further include electrolyte. In this case, the electrolyte is accommodated in the packaging case (specifically, the bottom-closed case 11), together with the capacitor element 10 with at least part of the surface of the dielectric layer coated with the conductive polymer.

<<Method for Manufacturing Electrolytic Capacitor>>

An example method for manufacturing an electrolytic capacitor according to an embodiment of the present invention will be described below step by step.

(i) Step of Preparing Capacitor Element 10 (First Step)

(i-1) Step of Preparing Anode 21 Having Dielectric Layer

First, a metal foil which is a raw material of the anode 21 is prepared. The metal may be of any type, but for easy formation of the dielectric layer, is preferably a valve metal such as aluminum, tantalum, and niobium, or an alloy containing a valve metal.

Next, the metal foil is surface-roughened. Surface roughening is conducted to form a plurality of projections and depressions on the metal foil. Surface roughening is preferably done by etching the metal foil. The etching may be done, for example, by direct-current electrolysis or alternating-current electrolysis.

Next, a dielectric layer is formed on the roughened surface of the metal foil. The dielectric layer may be formed by any method without limitation, and can be formed by applying chemical formation treatment to the metal foil. The chemical formation treatment may be performed by, for example, immersing the metal foil into a chemical formation solution such as an ammonium adipate solution. In the chemical formation treatment, a voltage may be applied, as necessary, while the metal foil is immersed in the chemical formation solution.

Usually, in view of mass productivity, a large-sized metal foil made of a valve metal or the like is subjected to the surface roughening and chemical formation treatments. In this case, the treated foil is cut to a desired size, thereby to prepare the anode 21.

(i-2) Step of Preparing Cathode 22

The cathode 22, like the anode, may be formed using a metal foil. The metal may be of any type, but is preferably a valve metal such as aluminum, tantalum, and niobium, or an alloy containing a valve metal. The surface of the metal foil may be roughened, as necessary.

The cathode 22 may be provided on its surface with a chemical formation film, or may be provided with a film of a metal different from the metal forming the cathode (different metal) or a non-metal film. Examples of the different metal and non-metal include metal such as titanium, and non-metal such as carbon.

(i-3) Step of Fabricating Capacitor Element (Wound Body) 10

Next, the capacitor element 10 is fabricated using the anode 21 and the cathode 22. The capacitor element can be obtained by laminating the anode 21 and the cathode 22 with the separator 23 therebetween. The anode 21 and the cathode 22 may be wound with the separator 23 therebetween, to form a wound body as illustrated in FIG. 2. In winding, the lead tabs 15A and 15B may be wound together, so that the lead tabs 15A and 15B extend upright from the wound body as illustrated in FIG. 2.

The separator 23 may be, for example, a nonwoven fabric comprising fibers of cellulose, polyethylene terephthalate, vinylon, or polyamide (e.g., aliphatic polyamide, aromatic polyamide such as aramid).

The lead tabs 15A and 15B may be formed from any material that is electrically conductive. The surface of the lead tabs 15A and 15B may be chemically formed. The contact area of the lead tabs 15A and 15B with the sealing member 12 and/or the connection area with lead wires 14A and 14B may be coated with a resin material.

The lead wires 14A and 14B to be connected to the lead tabs 15A and 15B, respectively, may also be formed from any material that is electrically conductive.

Next, of the anode 21, the cathode 22 and the separator 23, the outermost layer of the wound body (in FIG. 2, the cathode 22) is fixed with the unwinding prevention tape 24 applied onto the end of the outside surface. When the anode 21 is prepared by cutting a large-sized metal foil, chemical formation treatment may be further applied to the capacitor element in the form of a wound body or the like, in order to provide a dielectric layer on the cut surface of the anode 21.

(ii) Step of Impregnating Capacitor Element (Wound Body) 10 with First Processing Solution (Second Step)

Next, the capacitor element 10 is impregnated with a first processing solution.

The impregnation of the capacitor element 10 with the first processing solution may be done by any method that can provide the first processing solution to at least the anode (in particular, at least the dielectric layer). For example, it can be done by immersing the capacitor element in the first processing solution, or injecting the first processing solution into the capacitor element. The impregnation may be done under atmospheric pressure, but can be done under reduced pressure, for example, under an atmosphere of 10 to 100 kPa, preferably 40 to 100 kPa. The impregnation may be done under supersonic vibration, as necessary. The duration of impregnation is dependent on the size of the capacitor element 10, and is, for example, 1 second to 5 hours, preferably 1 minute to 30 minutes. Through this step, the capacitor element 10 is provided with the first processing solution.

Examples of the conductive polymer include polypyrrole, polythiophene, polyflan, polyaniline, polyacetylene, polyphenylene, polyphenylenevinylene, polyacene, and polythiophenevinylene. These may be used singly or in combination of two or more, or in the form of a copolymer of two or more monomers.

Note that, in the present specification, the polypyrrole, polythiophene, polyflan, polyaniline, and the like mean polymers including polypyrrole, polythiophene, polyflan, polyaniline, and the like as their basic skeletons, respectively. Accordingly, the polypyrrole, polythiophene, polyflan, polyaniline, and the like include derivatives thereof. For example, the polythiophene includes poly(3,4-ethylenedioxythiophene).

The conductive polymer may contain a dopant. The dopant may be, for example, polyanion. Examples of the polyanion includes anions of polyvinylsulfonic acid, polystyrenesulfonic acid, polyallylsulfonic acid, polyacrylicsulfonic acid, polymethacrylsulfonic acid, poly(2-acrylamide-2-methylpropanesulfonate), polyisoprenesulfonic acid, and polyacrylic acid. Preferred among them are polyanions derived from polystyrenesulfonic acid. These may be used singly or in combination of two or more. These may be in the form of a polymer of a single monomer, or a copolymer of two or more monomers.

The weight average molecular weight of the polyanion is not particularly limited, and is, for example, 1,000 to 1,000,000. The conductive polymer containing such polyanion can be easily and homogeneously dispersed in a liquid solvent including a first solvent, and can easily and uniformly adhere to the surface of the dielectric layer.

The first processing solution is required to contain at least a conductive polymer, and a liquid solvent including a first solvent. The first processing solution may be either a solution in which the conductive polymer is dissolved in the liquid solvent or a dispersion in which the conductive polymer is dispersed in the liquid solvent. In the dispersion, the conductive polymer is dispersed as particles in the liquid solvent. The dispersion can be obtained by polymerizing a raw material of the conductive polymer (e.g., a precursor of a monomer and/or oligomer of the conductive polymer) in the liquid solvent in the presence of a dopant, to produce particles of the conductive polymer containing the dopant. Alternatively, the dispersion can be obtained by polymerizing a raw material of the conductive polymer in the liquid solvent to produce particles of the conductive polymer, or dispersing particles of the conductive polymer synthesized in advance, in the liquid solvent.

The liquid solvent of the first processing solution is required to include at least the first solvent, and may include a solvent other than the first solvent. The liquid solvent contained in the first processing solution may include two or more different first solvents. The first solvent may occupy, for example, 30 mass % or more of the liquid solvent of the first processing solution, preferably 50 mass % or more, more preferably 70 mass % or more.

The first solvent is not particularly limited, and may be, for example, water or a non-aqueous solvent. Note that the non-aqueous solvent is a generic term referring to liquid other than water and water-containing liquid, and includes organic solvents and ionic liquid. The first solvent is preferably a polar solvent. The polar solvent may be a protic solvent or an aprotic solvent.

Examples of the protic solvent include alcohols such as methanol, ethanol, propanol, butanol, ethylene glycol (EG), propylene glycol (PG), polyethylene glycol (PEG), diethylene glycol monobutyl ether, glycerin, 1-propanol, butanol, and polyglycerine, formaldehyde, and water. Examples of the aprotic solvent include amides such as N-methylacetamide, N,N-dimethylformamide, and N-methyl-2-pyrrolidone, esters such as methyl acetate, ketones such as methyl ethyl ketone and γ-butyrolactone (γBL), esters such as 1,4-dioxane, sulfur-containing compounds such as dimethylsulfoxide and sulfolane (SL), and carbonate compounds such as propylene carbonate.

The first solvent is preferably a protic solvent. In particular, the first solvent is preferably water. In this case, the handleability of the first processing solution and the dispersibility of the conductive polymer can be improved. Furthermore, since water has low viscosity, in the later process, specifically in the third step, the contact between the conductive polymer and swelling agent can be expected to improve. When the first solvent is water, the water preferably occupies 50 mass % or more of the liquid solvent of the first processing solution, more preferably 70 mass % or more, particularly preferably 90 mass % or more.

The particles of the conductive polymer dispersed in the dispersion preferably has a median diameter in a volumetric particle size distribution measured with a particle size analyzer by dynamic light scattering method (hereinafter, simply, "median diameter by dynamic light scattering method") of 0.01 to 0.5 μm. The particle diameter of the conductive polymer can be adjusted by the polymerization conditions, dispersing conditions, or others.

The concentration of the conductive polymer (containing dopant or polyanion) in the first processing solution is preferably 0.5 to 10 mass %. The first processing solution having a concentration as above is suitable to allow an adequate amount of the conductive polymer to adhere, and is advantageous to improve the productivity because such first processing solution can easily impregnate into the capacitor element 10.

Although the liquid solvent such as the first solvent can be removed after the second step, as necessary, it is important that the capacitor element is subjected to the third step while at least part of the liquid solvent remains in the capacitor element (in particular, the anode). In the case of removing the liquid solvent after the second step, the liquid solvent may be removed by evaporation under heat, and may be removed under reduced pressure, as necessary. In the case of removing the liquid solvent after the second step, it is desirable to adjust the removal amount such that the amount of the liquid solvent remaining after the removal falls within the range described below.

(iii) Step of Swelling Conductive Polymer (Third Step)

In the third step, the capacitor element provided with the first processing solution is impregnated with a second processing solution containing a swelling agent, thereby to swell the conductive polymer.

In the capacitor element to be subjected to the third step, the remaining amount of the liquid solvent is preferably 5 mass % or more (e.g., 5 to 100 mass %), more preferably 20 mass % or more (e.g., 20 to 100 mass %) or 50 mass % or more (e.g., 50 to 100 mass %). When the remaining amount of the liquid solvent is in the range as above, the swelling agent can be easily mixed uniformly in the conductive polymer and the capacitor element in the third step, and therefore the conductive polymer can be easily allowed to adhere more uniformly to the surface of the dielectric layer.

Herein, the remaining amount of the liquid solvent is a ratio (mass %) of the mass of the liquid solvent contained in the capacitor element to be subjected to the third step, to the mass of the liquid solvent contained in the first processing solution impregnated into the capacitor element in the second step.

In the third step, it is important to swell the conductive polymer by impregnating the capacitor element with the second processing solution, while at least part of the first solvent remains in the capacitor element (in particular, the anode). The capacitor element including the anode with the liquid solvent remaining therein is highly permeable with the second processing solution. Hence, when the second processing solution is provided to the capacitor element in such a state, the second processing solution can permeate more deeply into the element and swell the conductive polymer therein. Such an effect is likely to be obtained especially when at least water remains. It is therefore preferable to use a liquid solvent containing at least water as the first solvent, for the first processing solution. When a liquid solvent containing water as the first solvent is used, the stability of the first processing solution can be improved, which is also advantageous.

Note that, in the present specification, the swelling agent refers to the one that can swell a conductive polymer film formed from a solution or dispersion containing a conductive polymer, such that the film taken out after immersed in the agent at room temperature (e.g., 20 to 30° C.) for a specific time (e.g., 24 hours) has a swelling rate of more than 1. The swelling rate of the film is a ratio of the thickness of the film taken out after immersed in the swelling agent, to the thickness (initial thickness) of the film before immersed in the swelling agent. Preferably, the second processing solution, as a whole, has a swelling action. Therefore, the swelling rate of the film when immersed in the second processing solution is also preferably more than 1. The swelling rate is more preferably 1.1 or more, further more preferably 1.5 or more. The initial thickness of the film is not particularly limited, and may be, for example, 20 to 40 μm.

The boiling point of the swelling agent is preferably higher than the boiling point of the first solvent. The difference between the boiling point of the swelling agent and the boiling point of the first solvent may be, for example, 20° C. or more, preferably 50° C. or more.

The swelling agent is preferably a liquid that is miscible with the liquid solvent contained in the first processing solution. Herein, the liquid miscible with the liquid solvent refers to a liquid capable of forming a homogeneous mixture with the liquid solvent. The swelling agent may be protic or aprotic. The swelling agent may be any compound that has a swelling action, including various compounds commonly called protonic solvents and aprotic solvents. Preferred among them are protic organic compounds (i.e. protic organic solvents) and/or aprotic organic compounds (i.e. aprotic organic solvents). The protic organic compounds preferably have a hydroxyl group, and/or a protic group such as carboxyl group.

Examples of the swelling agent include polyols (e.g., aliphatic polyols), carboxylic acids (e.g., $C_{1-5}$ carboxylic acids such as formic acid and acetic acid), chain sulfones (e.g., dimethylsulfoxide), and chain amides (e.g., N-methylacetamide, N,N-dimethylformamide). Examples of the aliphatic polyols include alkylene glycol such as ethylene glycol and propylene glycol, polyethylene glycol such as diethylene glycol and triethylene glycol, and glycerins such as glycerin and polyglycerol.

In a swelling agent having a hydroxyl group (e.g., aliphatic polyol), the hydroxyl value of the swelling agent is, for example, preferably 100 mgKOH/g or more, more preferably 300 mgKOH/g or more. When the swelling agent has a hydroxyl value as above, the swelling agent tends to exist stably among the conductive polymer particles, improving the dispersion stability. This can swell the conductive polymer more effectively, making it possible to further improve the recoverability of the dielectric layer.

The mass of the swelling agent impregnated into the capacitor element is preferably 2 to 100 times, more preferably 3 to 80 times as much as the mass of the conductive polymer impregnated into the capacitor element. When the mass ratio is in the range above, the conductive polymer can be swelled more effectively, and this can further effectively improve the recoverability of the dielectric layer.

The second processing solution may further contain a solvent and/or an additive, as necessary. When the amount of the swelling agent in the second processing solution is too small, the swelling agent may fail to exert its swelling action sufficiently. Preferably, the second processing solution, as a whole, has a swelling action. The ratio of the swelling agent in the second processing solution may be, for example, 20 to 100 mass %, but is preferably 50 to 100 mass %, more preferably 70 to 100 mass %.

Examples of the solvent added to the second processing solution other than the swelling agent include, among the non-aqueous solvents mentioned as examples of the first solvent for the first processing solution, protic solvents except alkylene glycol such as EG and PG and polyethylene glycol, and aprotic solvents. Other examples of the solvent include monoalkyl ethers of alkylene glycol (or polyalkylene glycol) such as diethylene glycol monobutyl ether, lactones such as γ-butyrolactone, cyclic ketones such as cyclohexanone and isophorone, carbonates such as diethyl carbonate, ethylene carbonate, and vinylene carbonate, lactams such as N-methyl-2-pyrrolidone, and cyclic sulfones such as 1,3-propane sultone and sulfolane. These may be used singly or in combination of two or more as the solvent to be contained in the second processing solution.

(iv) Step of Removing Solvent Component (Fourth Step)

After the third step, the solvent component remaining in the capacitor element can be removed in the fourth step. In the fourth step, it suffices if at least part of the solvent component is removed, and all of the solvent component may be removed. By removing the solvent component in the fourth step, the conductive polymer is allowed to adhere more uniformly to the surface of the dielectric layer.

Note that the solvent component as used herein refers to the liquid solvent in the first processing solution, the swelling agent in the second processing solution, and other solvents. Among them, at least part of at least the first solvent is preferably removed in the fourth step.

In the fourth step, the solvent component can be removed by evaporation under heat, and may be removed under atmospheric pressure, and may be removed under reduced pressure, as necessary. The temperature at which the solvent component is removed may be, for example, 40 to 250° C. The temperature at which the solvent component is removed may be equal to or higher than the boiling point of the first solvent, and may be lower than the boiling point of the swelling agent. The removal of the solvent component may be done, for example, in multiple stages with different temperatures (e.g., two or three or more stages), or while the temperature is elevated.

The capacitor element 10 with the conductive polymer adhering between the anode 21 and the cathode 22 (in particular, to the surface of the dielectric layer) is thus produced. The conductive polymer adhering to the surface of the dielectric layer functions as a practical cathode material.

The conductive polymer preferably adheres so as to coat at least part of the surface of the dielectric layer. In this case, the conductive polymer may adhere not only to the surface of the dielectric layer but also to the surface of the cathode 22 and/or the separator 23. At least one step selected from the group consisting of the second step (ii) of impregnating the capacitor element 10 including the anode 21 having the dielectric layer, with the first processing solution, the step (optional) of removing the liquid solvent after the second step, the third step (iii) of swelling the conductive polymer, and the fourth step (iv) (optional) of removing the solvent component may be repeated twice or more, as necessary. A step or steps selected from these steps may be repeated as a series of consecutive steps twice or more. For example, the second step may be repeated more than once, which is then followed by another step. The second step, the optional liquid solvent removal step, and the third step may be repeated as a series of consecutive steps more than once. It is advantageous to repeat at least the first step more than once since this can easily increase the coating rate of the conductive polymer on the dielectric layer.

The solvent component may be totally removed from the capacitor element 10 obtained in the third step or the fourth step. Alternatively, the solvent component may remain in the capacitor element 10 obtained in the third step or the fourth step. When the solvent component remains, the recovery function of the dielectric layer can be further improved. Moreover, in the case where the capacitor element is impregnated with electrolyte in a fifth step, the remaining solvent component, which exists between the conductive polymer particles, can facilitate the penetration of electrolyte among the conductive polymer particles. This makes it easy to obtain the recovery function of the dielectric layer due to the electrolyte. The improved recovery function of the dielectric layer can effectively suppress electrical short-circuiting, even when the warranty period of the electrolytic capacitor has expired.

(v) Step of Impregnating Capacitor Element (Wound Body) 10 with Electrolyte (Fifth Step)

In the fifth step, the capacitor element 10 can be further impregnated with electrolyte after the third step. The fifth step is required to be performed after the third step. For example, the fifth step may be performed subsequently to the third step, or another step (e.g., fourth step) may be performed between the third step and the fifth step. The fifth step, although not necessarily performed, can further improve the recovery function of the dielectric layer, by impregnating the electrolyte.

The electrolyte may be a non-aqueous solvent, or a solution containing a non-aqueous solvent and an ionic material (solute) dissolved in the non-aqueous solvent. The non-aqueous solvent may be an organic solvent or an ionic liquid. The non-aqueous solvent preferably has a high boiling point. The non-aqueous solvent having a high boiling point may be, for example, an ionic liquid and/or an organic solvent having a high boiling point. The boiling point of the non-aqueous solvent is, for example, higher than 100° C., preferably 150° C. or higher, more preferably 200° C. or higher. Examples of the organic solvent include organic solvents mentioned as examples of the first solvent for the first processing solution, polyols mentioned as examples of the swelling agent, and solvents mentioned as examples for the second processing solution. These non-aqueous solvents may be used singly or in combination of two or more.

Preferable examples of the non-aqueous solvent include alkylene glycol, polyethylene glycol, glycerins, lactone, cyclic sulfone, formaldehyde, ethers, amides, esters, and ketones. Preferred among them are polyethylene glycol and/or glycerins.

The solute may be a salt of an anion and a cation, and preferably is an organic salt in which either the anion or the cation or both is an organic substance. Examples of the organic salt include trimethylamine maleate, triethylamine borodisalicylate, ethyldimethylamine phthalate, mono 1,2, 3,4-tetramethylimidazolinium phthalate, mono 1,3-dimethyl-2-ethylimidazolinium phthalate. These solutes may be used singly or in combination of two or more.

The impregnation of the capacitor element 10 with the electrolyte can be done by any known method. For example, it can be done by immersing the capacitor element 10 in the electrolyte, or injecting the electrolyte into a container accommodating the capacitor element 10. The impregnation of the capacitor element with electrolyte may be performed under reduced pressure (e.g., 10 to 100 kPa), as necessary.

(vi) Step of Sealing the Capacitor Element (Wound Body) 10

Next, the capacitor element 10 is sealed. Specifically, first, the capacitor element 10 is placed in the bottom-closed case 11, with the lead wires 14A and 14B positioned on the upper side of the bottom-closed case 11 where it opens. The material of the bottom-closed case 11 can be a metal such as aluminum, stainless steel, copper, iron, and brass, or an alloy thereof.

Next, the sealing member 12, which is formed such that the lead wires 14A and 14B can be inserted therethrough, is disposed above the capacitor element 10, to seal the capacitor element 10 in the bottom-closed case 11. The sealing member 12 may be of any material that is electrically insulative. The insulative material is preferably an elastic material, and particularly preferably an elastic material with high heat resistance, such as silicone rubber, fluororubber, ethylene propylene rubber, Hypalon rubber, butyl rubber, and isoprene rubber.

Next, the bottom-closed case 11 is radially constricted at near the opening end thereof, and the opening end is curled and crimped onto the sealing member 12. The seat plate 13 is then disposed at the curled portion, and thus, the electrolytic capacitor as illustrated in FIG. 1 is completed. This may be followed by aging treatment carried out with application of a rated voltage.

Although the above embodiments describe a wound electrolytic capacitor, the application of the present invention is not limited in scope thereto, and the present invention is applicable to other electrolytic capacitors, for example, a chip electrolytic capacitor including a sintered metal as an anode, and a laminated electrolytic capacitor including a metal plate as an anode.

EXAMPLES

The present invention will now be described with reference to Examples and Comparative Examples, but should not be construed to be limited thereto.

Example 1

A wound electrolytic capacitor (diameter: 6.3 mm, length: 5.8 mm) having a rated voltage of 35 V and a rated capacitance of 47 µF as illustrated in FIG. 1 was produced and evaluated as follows.

(1) Production of Electrolytic Capacitor (Preparation of Anode Having Dielectric Layer)

An aluminum foil having a thickness of 100 µm was etched, thereby to roughen the surface of the aluminum foil. The aluminum foil was then subjected to chemical formation treatment using an aqueous ammonium adipate solution, thereby to form a dielectric layer on the surface of the aluminum foil. An anode having a dielectric layer was thus prepared.

(Preparation of Cathode)

An aluminum foil having a thickness of 50 µm was etched, thereby to roughen the surface of the aluminum foil. A cathode was thus prepared.

(Fabrication of Capacitor Element (Wound Body))

An anode lead tab and a cathode lead tab were connected to the anode and the cathode, respectively. The anode and the cathode were wound, together with the lead tabs, with a separator therebetween, to give a capacitor element. An anode lead wire and a cathode lead wire were each connected to the end of the corresponding lead tab extending from the capacitor element. The capacitor element was then subjected to chemical formation treatment again, to form a dielectric layer on the cut edge of the anode. Next, the end of the outer surface of the capacitor element was fixed with an unwinding prevention tape.
(Impregnation with First Processing Solution)

A mixed solution was prepared by dissolving 3,4-ethylenedioxythiophene and polystyrenesulfonic acid as a dopant in ion-exchanged water (first solvent). To the resultant mixed solution, while being stirred, ferric sulfate and sodium persulfate (oxidant) dissolved in ion-exchanged water were added, to allow polymerization to proceed. After the reaction, the resultant reaction solution was dialyzed to remove the unreacted monomers and excess oxidant, to prepare a dispersion (first processing solution) containing poly-3,4-ethylenedioxythiophene (PEDOT) doped with approximate 5 mass % of polystyrenesulfonic acid.

Next, the capacitor element was impregnated with the first processing solution for 5 minutes.
(Impregnation with Second Processing Solution)

Next, the capacitor element was impregnated with a second processing solution. The swelling agent contained in the second processing solution was polyethylene glycol (weight average molecular weight Mw: 300). The mass of the swelling agent impregnated into the capacitor element was 5 times as much as the mass of the conductive polymer impregnated into the capacitor element.

The capacitor element was then heated at 150° C. for 20 minutes, thereby to remove the solvent component.

In that way, the capacitor element with the conductive polymer adhering thereto was fabricated.
(Impregnation with Electrolyte)

Next, the capacitor element was impregnated with electrolyte under reduced pressure. The electrolyte was a mixed solution of PEG:yBL:SL:mono(ethyldimethylamine)phthalate (solute)=25:25:25:25 (mass ratio).
(Sealing of Capacitor Element)

The capacitor element impregnated with the electrolyte was placed in a packaging case as illustrated in FIG. 1, and sealed, to complete an electrolytic capacitor. In the similar manner, totally 300 electrolytic capacitors were produced.
(2) Performance Evaluation
(a) Capacitance A capacitance (µF) was measured as the initial characteristics of the electrolytic capacitor. Specifically, an initial capacitance (µF) at the frequency of 120 Hz of the electrolytic capacitor was measured with an LCR meter for 4-terminal measurement.

The initial capacitance of randomly selected 120 electrolytic capacitors was measured, and the measured values were averaged.
(b) Leakage Current A leakage current (µA) was measured after a rated voltage of 25 V was applied to the electrolytic capacitor, with a 1-kΩ resistance connected thereto in series, for 1 minute from a direct-current supply. The leakage current was measured with respect to randomly selected 120 electrolytic capacitors.

Comparative Example 1

An electrolytic capacitor was produced and its performance was evaluated in the same manner as in Example 1, except that after the capacitor element was impregnated with the first processing solution, the impregnation with the second processing solution was not performed, and the solvent component was removed by heating at 150° C. for 30 minutes.

Comparative Example 2

An electrolytic capacitor was produced and its performance was evaluated in the same manner as in Example 1, except that after the capacitor element was impregnated with the first processing solution, the solvent component was completely removed by heating at 150° C. for 30 minutes (the remaining amount of the solvent component in the capacitor element: 0 mass %).

Comparative Example 3

An electrolytic capacitor was produced and its performance was evaluated in the same manner as in Example 1, except that γ-butyrolactone was used in place of the polyethylene glycol used for the second processing solution.

Example 2

An electrolytic capacitor was produced and its performance was evaluated in the same manner as in Example 1, except that diethylene glycol was used in place of the polyethylene glycol used for the second processing solution.

Example 3

An electrolytic capacitor was produced and its performance was evaluated in the same manner as in Example 1, except that ethylene glycol was used in place of the polyethylene glycol used for the second processing solution.

Example 4

An electrolytic capacitor was produced and its performance was evaluated in the same manner as in Example 1, except that dimethylsulfoxide was used in place of the polyethylene glycol used for the second processing solution.

Example 5

An electrolytic capacitor was produced and its performance was evaluated in the same manner as in Example 1, except that N,N-dimethylformamide was used in place of the polyethylene glycol used for the second processing solution.

Example 6

An electrolytic capacitor was produced and its performance was evaluated in the same manner as in Example 1, except that a mixed solution containing polyethylene glycol (swelling agent) and γ-butyrolactone (solvent) in a mass ratio of 75:25 was used in place of the polyethylene glycol used for the second processing solution. The mass of the swelling agent impregnated into the capacitor element was 3.75 times as much as the mass of the conductive polymer impregnated into the capacitor element.

Example 7

An electrolytic capacitor was produced and its performance was evaluated in the same manner as in Example 1, except that a mixed solution containing polyethylene glycol (swelling agent) and γ-butyrolactone (solvent) in a mass ratio of 50:50 was used in place of the polyethylene glycol used for the second processing solution. The mass of the swelling agent impregnated into the capacitor element was 2.5 times as much as the mass of the conductive polymer impregnated into the capacitor element.

Example 8

An electrolytic capacitor was produced and its performance was evaluated in the same manner as in Example 1, except that a mixed solution containing polyethylene glycol (swelling agent) and γ-butyrolactone (solvent) in a mass ratio of 25:75 was used in place of the polyethylene glycol in the second processing solution. The mass of the swelling agent impregnated into the capacitor element was 1.25 times as much as the mass of the conductive polymer impregnated into the capacitor element.

The results of Examples and Comparative Examples are shown in Table 1. The components of the second processing solution are also shown in Table 1.

With respect to the polyethylene glycol, a film was formed from a dispersion containing polyethylene dioxythiophene doped with the polystyrenesulfonic acid used in the present Examples, and its swelling rate was measured, which was more than 1. With respect to each of the diethylene glycol, ethylene glycol, dimethylsulfoxide and N,N-dimethylformamide as well, the swelling rate was more than 1. A similar measurement was carried out with respect to the γ-butyrolactone. The swelling rate thereof, however, was 1 or less.

TABLE 1

|  | Second processing solution | Capacitance/ μF | LC/μA |
| --- | --- | --- | --- |
| Ex. 1 | polyethylene glycol | 41.5 | 0.52 |
| Ex. 2 | diethylene glycol | 41.8 | 0.51 |
| Ex. 3 | ethylene glycol | 42 | 0.49 |
| Ex. 4 | dimethylsulfoxide | 41.5 | 0.55 |
| Ex. 5 | N,N-dimethylformamide | 41.4 | 0.55 |
| Com. Ex. 1 | — | 27.5 | 12.21 |
| Com. Ex. 2 | polyethylene glycol | 26.8 | 1.52 |
| Com. Ex. 3 | γ-butyrolactone | 41.2 | 2.29 |
| Ex. 6 | polyethylene glycol (75) + γ-butyrolactone (25) | 41.6 | 0.51 |
| Ex. 7 | polyethylene glycol (50) + γ-butyrolactone (50) | 41.4 | 0.54 |
| Ex. 8 | polyethylene glycol (25) + γ-butyrolactone (75) | 41.6 | 0.81 |

Table 1 shows that, in Example 1, the leakage current was suppressed, and a large capacitance was obtained. In contrast, when the capacitor element was not impregnated with the second processing solution (Comparative Example 1), the leakage current was increased, and the capacitance was reduced. Furthermore, when no first solvent remained in the capacitor element during impregnation with the second processing solution (Comparative Example 2), in spite of performing the impregnation with the second processing solution, the leakage current was not reduced to almost the same level as that in Example 1, and almost no difference in the capacitance from Comparative Example 1 was observed. In Comparative Example 3 using γ-butyrolactone in place of the swelling agent, the capacitance was improved, but the leakage current was not suppressed sufficiently.

In Examples 2 to 5 using other swelling agents in place of the polyethylene glycol, like in Example 1, the leakage current was suppressed, and a large capacitance was obtained.

Likewise, when using the second processing solution containing γ-butyrolactone in addition to the polyethylene glycol, the leakage current was suppressed, and a large capacitance was obtained.

INDUSTRIAL APPLICABILITY

The present invention is applicable to an electrolytic capacitor including a conductive polymer as a cathode material.

REFERENCE SIGNS LIST

10: Capacitor element, 11: Bottom-closed case, 12: Sealing member, 13: Seat plate, 14A, 14B: Lead wire, 15A, 15B: Lead tab, 21: Anode, 22: Cathode, 23: Separator, 24: Unwinding prevention tape

The invention claimed is:

1. A method for manufacturing an electrolytic capacitor, the method comprising:
    a first step of preparing a capacitor element including an anode having a dielectric layer;
    a second step of impregnating the capacitor element with a first processing solution including at least a conductive polymer, and a liquid solvent including a first solvent; and
    a third step of swelling the conductive polymer after the second step, by impregnating the capacitor element with a second processing solution including a swelling agent while at least part of the first solvent remains in the capacitor element,
    wherein an remaining amount of the liquid solvent in the capacitor element to be subjected to the third step is 5 mass % or more relative to a mass of the liquid solvent contained in the first processing solution impregnated into the capacitor element in the second step.

2. The method for manufacturing an electrolytic capacitor according to claim 1, wherein a boiling point of the swelling agent is higher than a boiling point of the first solvent.

3. The method for manufacturing an electrolytic capacitor according to claim 1, wherein the swelling agent is at least one selected from the group consisting of polyols, carboxylic acids, chain sulfones, and chain amides.

4. The method for manufacturing an electrolytic capacitor according to claim 1, wherein the swelling agent is an aliphatic polyol.

5. The method for manufacturing an electrolytic capacitor according to claim 1, wherein a mass of the swelling agent impregnated into the capacitor element is 2 to 100 times as much as a mass of the conductive polymer impregnated into the capacitor element.

6. The method for manufacturing an electrolytic capacitor according to claim 1, further comprising a fourth step of removing at least part of the first solvent, after the third step.

7. The method for manufacturing an electrolytic capacitor according to claim 1, wherein
    the first solvent is water; and
    in the third step, the conductive polymer is swelled by impregnating the capacitor element with the second processing solution while at least water remains in the capacitor element.

8. The method for manufacturing an electrolytic capacitor according to claim 1, further comprising a fifth step of impregnating the capacitor element with electrolyte, after the third step.

9. A method for manufacturing an electrolytic capacitor, the method comprising:
    a first step of preparing a capacitor element including an anode having a dielectric layer;
    a second step of impregnating the capacitor element with a first processing solution including at least a conductive polymer, and a liquid solvent including a first solvent; and
    a third step of swelling the conductive polymer after the second step, by impregnating the capacitor element with a second processing solution including a swelling agent while at least part of the first solvent remains in the capacitor element, wherein the swelling agent is at least one selected from the group consisting of carboxylic acids, chain sulfones, and chain amides.

10. The method for manufacturing an electrolytic capacitor according to claim 9, wherein a boiling point of the swelling agent is higher than a boiling point of the first solvent.

11. The method for manufacturing an electrolytic capacitor according to claim 9, wherein a mass of the swelling agent impregnated into the capacitor element is 2 to 100 times as much as a mass of the conductive polymer impregnated into the capacitor element.

12. The method for manufacturing an electrolytic capacitor according to claim 9, further comprising a fourth step of removing at least part of the first solvent, after the third step.

13. The method for manufacturing an electrolytic capacitor according to claim 9, wherein:
   the first solvent is water, and
   in the third step, the conductive polymer is swelled by impregnating the capacitor element with the second processing solution while at least water remains in the capacitor element.

14. The method for manufacturing an electrolytic capacitor according to claim 9, further comprising a fifth step of impregnating the capacitor element with electrolyte, after the third step.

15. A method for manufacturing an electrolytic capacitor, the method comprising:
   a first step of preparing a capacitor element including an anode having a dielectric layer;
   a second step of impregnating the capacitor element with a first processing solution including at least a conductive polymer, and a liquid solvent including a first solvent; and
   a third step of swelling the conductive polymer after the second step, by impregnating the capacitor element with a second processing solution including a swelling agent while at least part of the first solvent remains in the capacitor element,
   wherein the swelling agent is at least one selected from the group consisting of polyethylene glycol and polyglycerol.

16. The method for manufacturing an electrolytic capacitor according to claim 15, wherein a boiling point of the swelling agent is higher than a boiling point of the first solvent.

17. The method for manufacturing an electrolytic capacitor according to claim 15, wherein a mass of the swelling agent impregnated into the capacitor element is 2 to 100 times as much as a mass of the conductive polymer impregnated into the capacitor element.

18. The method for manufacturing an electrolytic capacitor according to claim 15, further comprising a fourth step of removing at least part of the first solvent, after the third step.

19. The method for manufacturing an electrolytic capacitor according to claim 15, wherein:
   the first solvent is water, and
   in the third step, the conductive polymer is swelled by impregnating the capacitor element with the second processing solution while at least water remains in the capacitor element.

20. The method for manufacturing an electrolytic capacitor according to claim 15, further comprising a fifth step of impregnating the capacitor element with electrolyte, after the third step.

* * * * *